(12) United States Patent
Wu (10) Patent No.: US 7,746,416 B2
(45) Date of Patent: Jun. 29, 2010

(54) PIXEL ARRAY SUBSTRATE HAVING STORAGE CAPACITANCES THAT VARY ALONG A SCAN LINE

(75) Inventor: Yuan-Liang Wu, Tainan (TW)

(73) Assignee: Chimei Innolux Corporation (TW)

( * ) Notice: Subject to any disclaimer, the term of this patent is extended or adjusted under 35 U.S.C. 154(b) by 1089 days.

(21) Appl. No.: 11/365,262

(22) Filed: Mar. 1, 2006

(65) Prior Publication Data
US 2006/0197726 A1   Sep. 7, 2006

(30) Foreign Application Priority Data
Mar. 2, 2005   (TW) ............................... 94106207 A (51) Int. Cl.
  *G02F 1/1343*   (2006.01)
(52) U.S. Cl. ............................ 349/38; 345/87; 349/139
(58) Field of Classification Search ................... 349/38, 349/39, 43, 139, 143; 345/87
See application file for complete search history.

(56) References Cited

U.S. PATENT DOCUMENTS

| | | | | |
|---|---|---|---|---|
| 6,028,650 | A * | 2/2000 | Kuroha et al. | 349/38 |
| 6,717,628 | B2 * | 4/2004 | Kumagawa et al. | 349/38 |
| 6,760,081 | B2 * | 7/2004 | Takagi | 349/38 |
| 6,816,208 | B2 * | 11/2004 | Fukami et al. | 349/39 |
| 6,897,908 | B2 * | 5/2005 | Lee et al. | 349/43 |
| 6,982,775 | B2 * | 1/2006 | Lee et al. | 349/139 |
| 2009/0096950 | A1 * | 4/2009 | Kim et al. | 349/43 |

OTHER PUBLICATIONS

Office Action dated Apr. 24, 2009 in counterpart Chinese Patent Application 0555515 (5 pages) (English Translation also attached).

* cited by examiner

Primary Examiner—Ellen Kim
(74) Attorney, Agent, or Firm—Trop Pruner & Hu, P.C.

(57) ABSTRACT

A display device has a pixel array substrate that contains a support substrate and a plurality of pixel areas arranged on the support substrate. Each pixel area contains a pixel electrode and a capacitor electrode. Scan lines and common lines are also provided, where each common line has portions provided in respective pixel areas. Each pixel area has a storage capacitance defined by an overlapping area between a respective capacitor electrode and a respective one of a scan line and common line, where the storage capacitances of pixel areas along each scan line varies along the scan line.

33 Claims, 7 Drawing Sheets

PIXEL ARRAY SUBSTRATE HAVING STORAGE CAPACITANCES THAT VARY ALONG A SCAN LINE

CROSS-REFERENCE TO RELATED APPLICATION

This claims priority under 35 U.S.C. §119 of Taiwan patent application No. 94106207, filed Mar. 2, 2005.

TECHNICAL FIELD

This invention relates generally to a pixel array substrate having storage capacitances that vary along a scan line, such as a pixel array substrate for use in a liquid crystal display (LCD) device.

BACKGROUND

Flat panel display devices generally provide relatively good display quality, efficient space utilization, low power consumption, and absence of radiation. Thin film transistor (TFT) liquid crystal display (LCD) devices are a popular type of flat panel display device.

Figure 1:
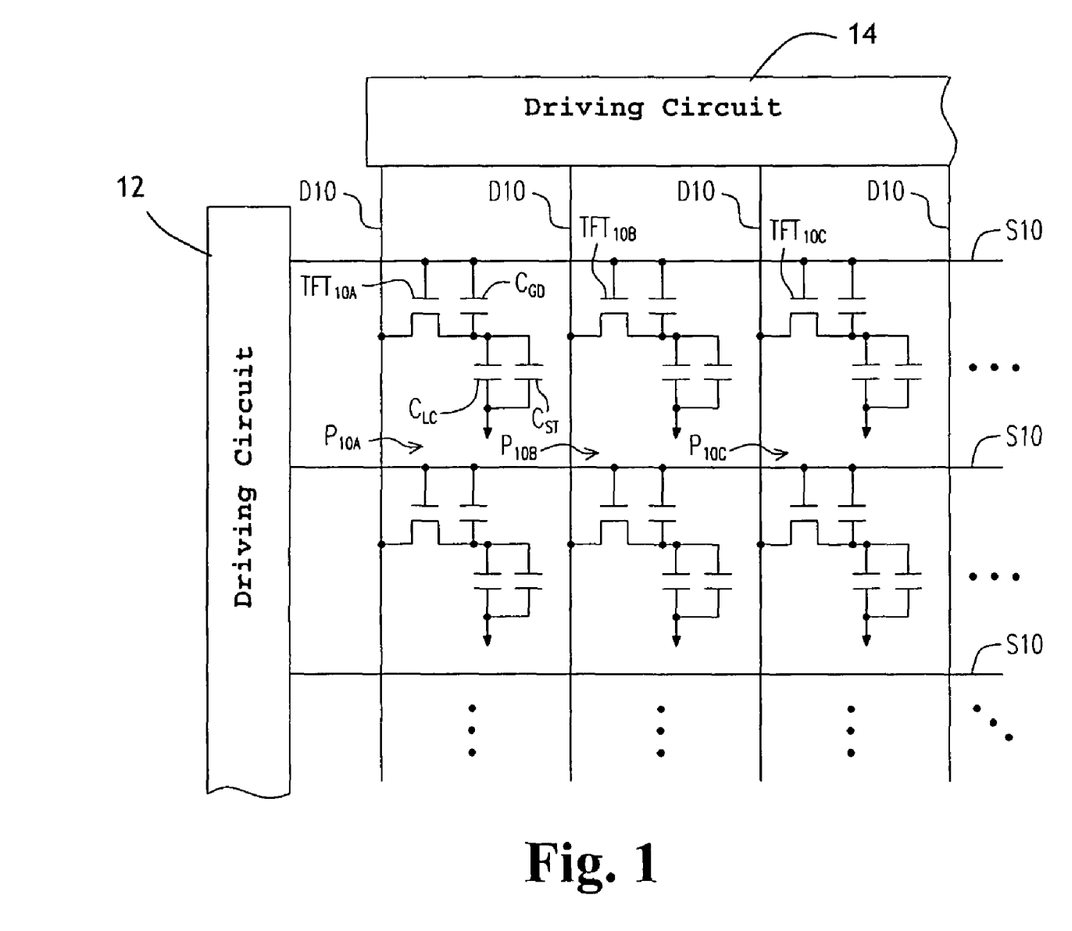
FIG. 1 is a circuit diagram of an example liquid crystal display (LCD) device having thin film transistors.

FIG. 1 depicts a circuit schematic diagram of a portion of a TFT LCD device. The LCD device has an array of thin film transistors $TFT_{10A}$, $TFT_{10B}$, $TFT_{10C}$, and so forth, for respective pixels $P_{10A}$, $P_{10B}$, $P_{10C}$, and so forth. The thin film transistors $TFT_{10A}$, $TFT_{10B}$, $TFT_{10C}$ and pixels $P_{10A}$, $P_{10B}$, $P_{10C}$ are arranged in a row of the LCD device, where all TFTs in this row are driven by the same scan line S10. There are multiple rows of TFTs an pixels along respective scan lines. When a scan line S10 is driven to a sufficient activation voltage (by a scan line driving circuit 12), the TFTs $TFT_{10A}$, $TFT_{10B}$, $TFT_{10C}$, and so forth, that are connected to the scan line S10, will be turned on, so that the data (voltage level) carried on each of the data lines D10 can be written into the respective pixels $P_{10A}$, $P_{10B}$, $P_{10C}$, and so forth. The data lines D10 are driven by a data line driving circuit 14. Upon completion of the pixel writing, the TFTs $TFT_{10A}$, $TFT_{10B}$, $TFT_{10C}$, and so forth, are turned off, and the voltage level of the pixel electrodes in each of the pixels $P_{10A}$, $P_{10B}$, $P_{10C}$, and so forth, are maintained by a respective liquid crystal capacitor and the pixel storage capacitor.

However, when the TFTs are turned off, the voltage level of the pixel electrodes in corresponding pixels can change due to coupling effects from voltage changes on the scan line. The voltage change of a pixel electrode due to coupling effect is referred to as feed-through voltage ($V_{FD}$). The feed-through voltage can generally be expressed as:

$$V_{FD} = [C_{GD}/(C_{LC} + C_{ST} + C_{GD})] \times \Delta V_G, \quad \text{(Eq. 1)}$$

where $C_{LC}$ in Eq. 1 is the liquid crystal capacitor, $C_{ST}$ is the pixel storage capacitor, $C_{GD}$ is the capacitor between the gate electrode and the drain electrode of the TFT, and $\Delta V_G$ is the voltage difference between the activation voltage of the TFT and the turn-off (or deactivation) voltage of the TFT, on a scan line. Note that other capacitances in each pixel may also contribute to $V_{FD}$, but such other capacitances are typically of relatively low values.

In an LCD device, the rotation angle of liquid crystal molecules is changed by controlling the size of the electric field applied to the liquid crystal molecules to vary the displayed gray scale. Since the size of the electric field applied to the liquid crystal molecules of a pixel depends on the voltage difference between the pixel electrode of the pixel and a common electrode, the display quality of the LCD device will be affected when the voltage level of the pixel electrode changes due to the impact from feed-through voltage $V_{FD}$.

Typically, the impact of the feed-through voltage $V_{FD}$ can be eliminated or reduced by adjusting the voltage of the common electrode. However, due to the impact from the resistance and capacitance of a scan line, $\Delta V_G$ will be reduced with an increase of the distance between pixels and the input end of the scan line (the input end is the end of the scan line connected to the scan line driving circuit 12, as depicted in FIG. 1). With increasing distance along the scan line from the input end, the increased resistance and capacitance causes the activation voltage on the scan line to be reduced, which in turn causes reduction of $\Delta V_G$.

In FIG. 1, $\Delta V_G$ of the pixels $P_{10A}$, $P_{10B}$, and $P_{10C}$ will be such that $(\Delta V_G)A > (\Delta V_G)B > (\Delta V_G)C$, where $(\Delta V_G)A$ represents $\Delta V_G$ at pixel $P_{10A}$, $(\Delta V_G)B$ represents $\Delta V_G$ at pixel $P_{10B}$, and $(\Delta V_G)C$ represents $\Delta V_G$ at pixel $P_{10C}$. Therefore, according to Eq. 1, when the $C_{LC}$, $C_{ST}$, and $C_{GD}$ of the pixels are the same, $\Delta V_{FD}$ of the pixels $P_{10A}$, $P_{10B}$, and $P_{10C}$ will be such that $(V_{FD})A > (V_{FD})B > (V_{FD})C$, where $(V_{FD})A$ is the feed-through voltage for pixel $P_{10A}$, $(V_{FD})B$ is the feed-through voltage for pixel $P_{10B}$, and so forth. Consequently, the impact from $V_{FD}$ cannot be eliminated by just adjusting the voltage level of the common electrode, which would cause a flicker problem in the picture of the liquid crystal display device.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 2A:
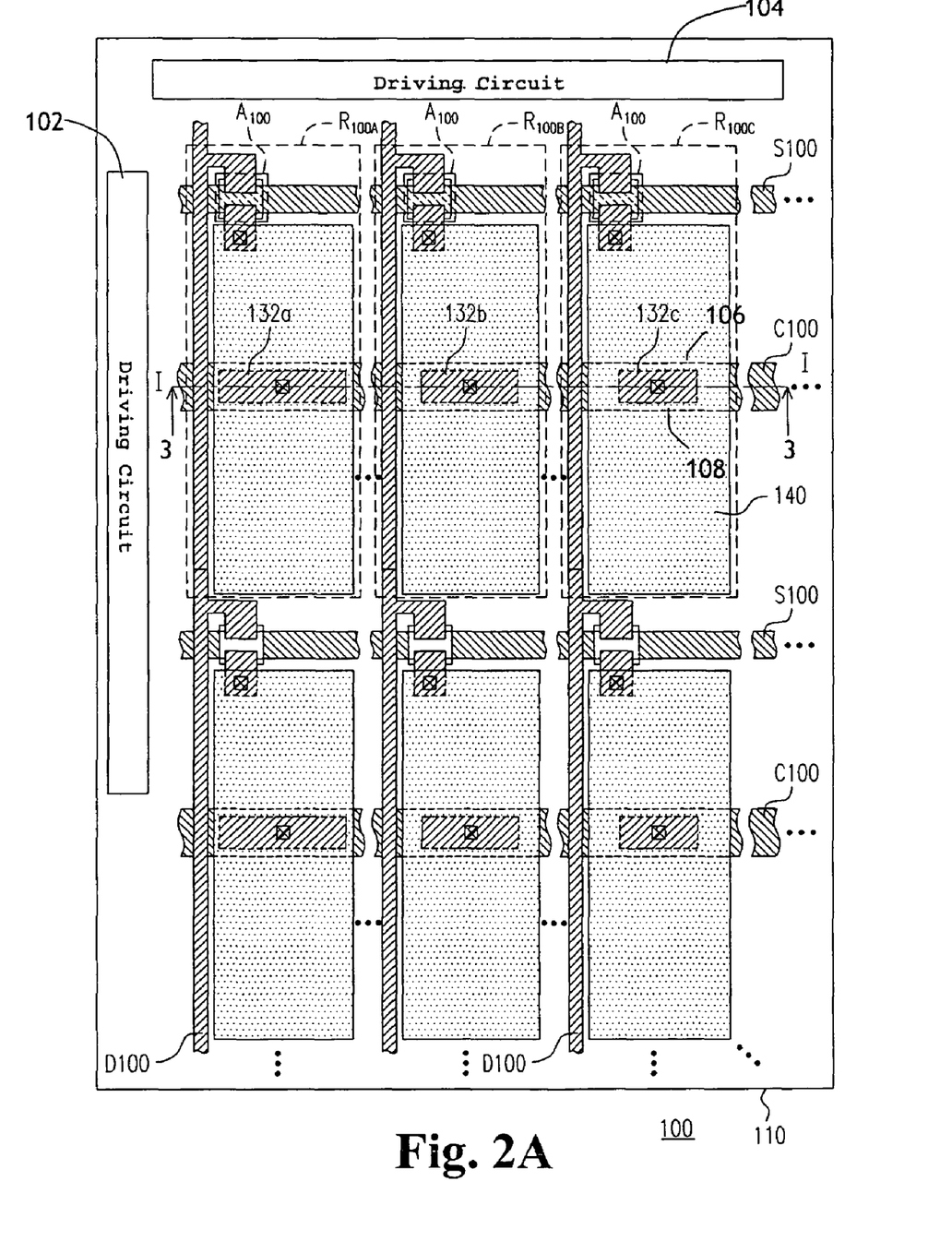
FIGS. 2A-2C are partial top view diagrams of pixel array substrates, according to several embodiments for use in LCD devices.
Figure 2B:
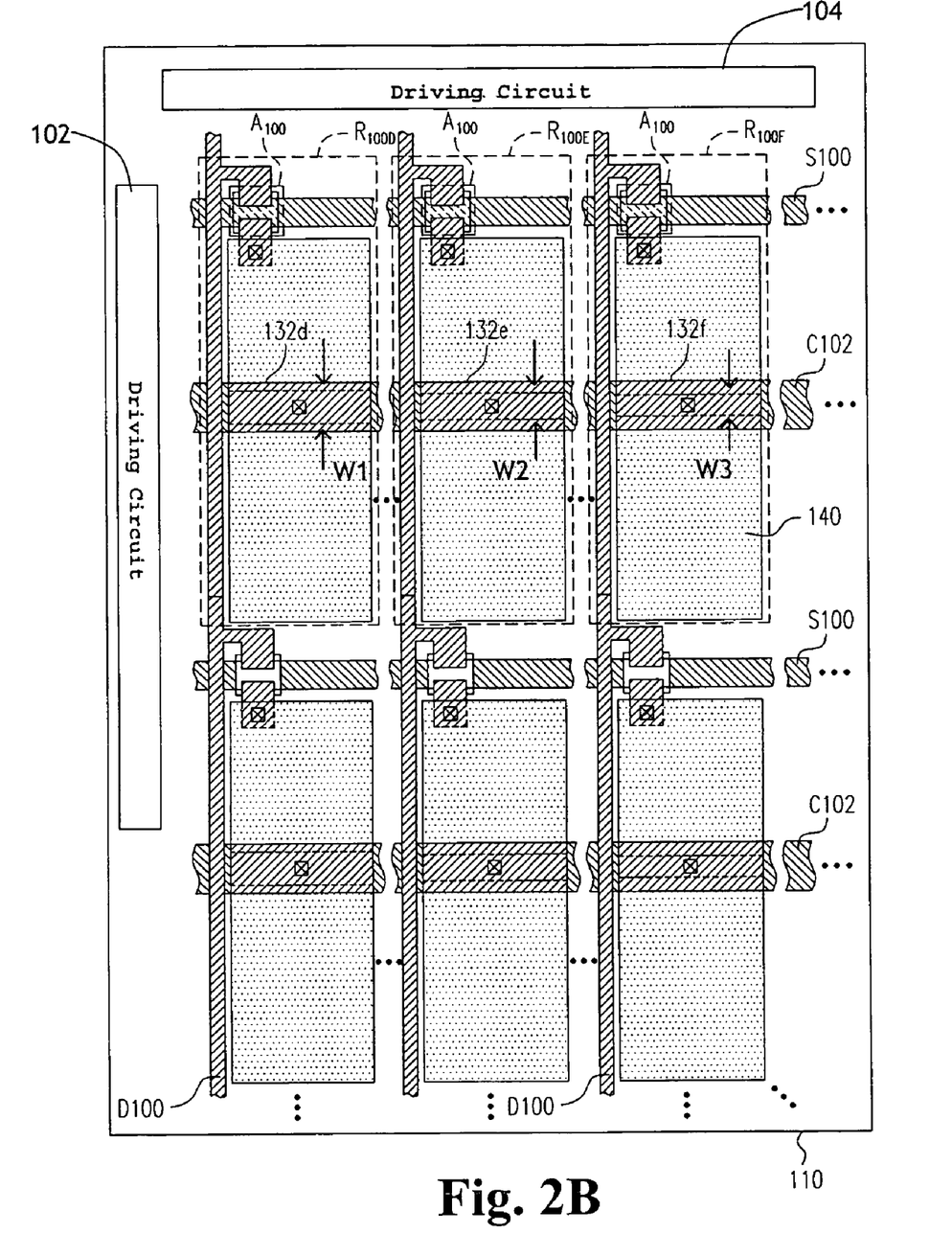
Figure 2C:
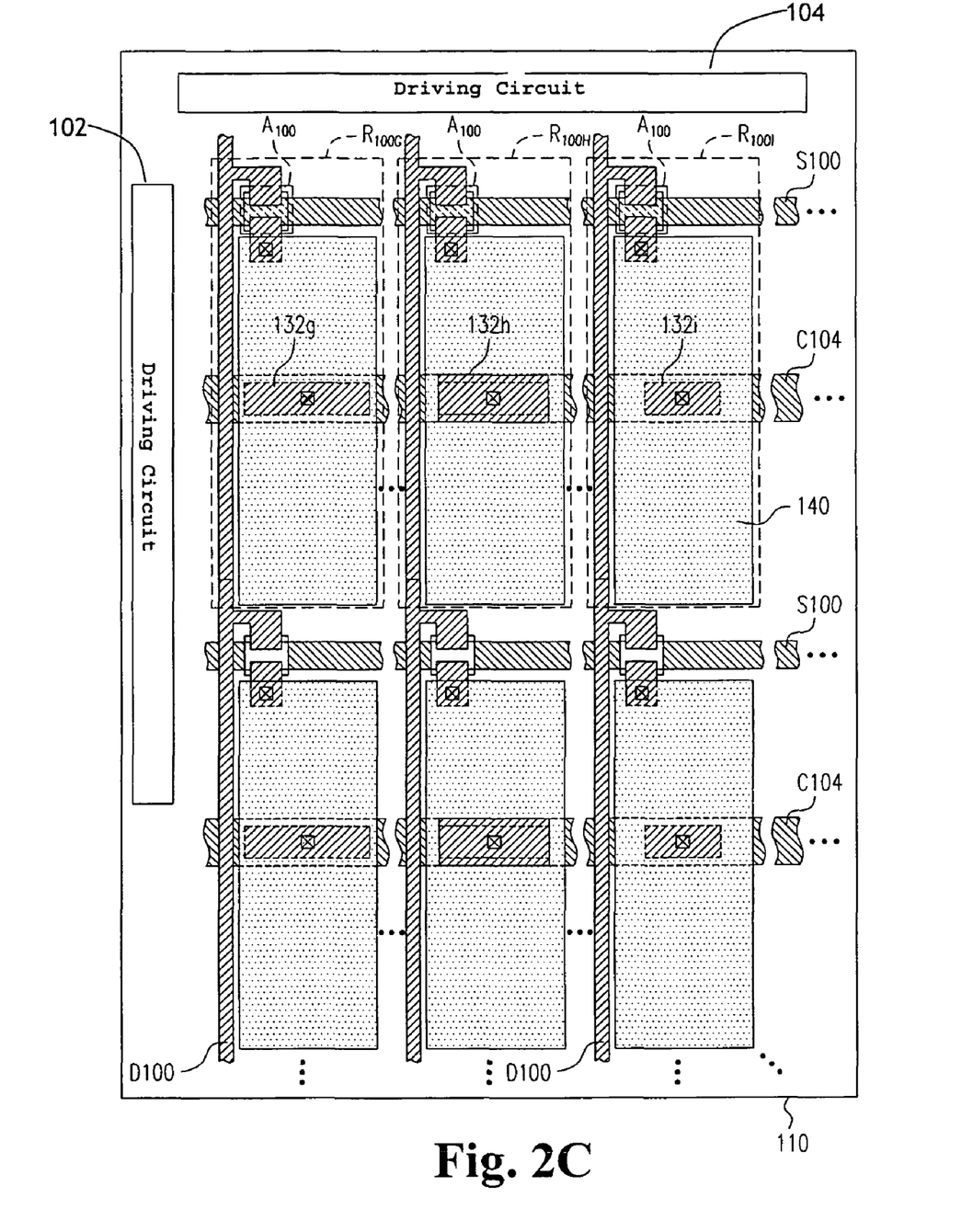
Figure 3:
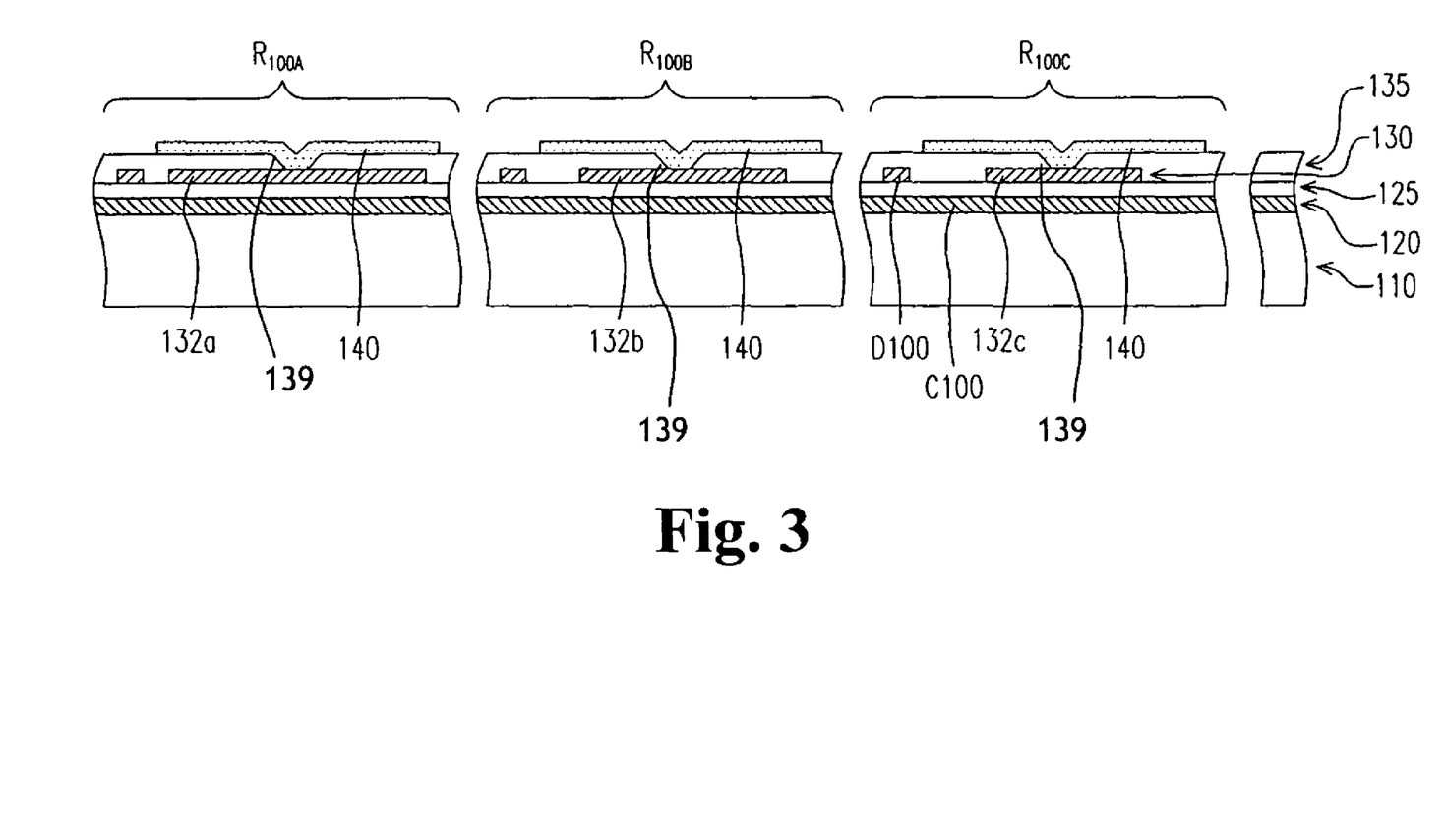
FIG. 3 is a cross-sectional view of the pixel array substrate of FIG. 2A.

FIGS. 2A-2C are partial top views of pixel array substrates 100 according to respective embodiments. FIG. 3 shows the cross-sectional profile along the 3-3 section in FIG. 2A. The pixel array substrates 100 are used in display devices, such as liquid crystal display (LCD) devices. Each pixel array substrate 100 includes an array of pixels, where each pixel is defined by a pixel area (represented as $R_{100}$ in FIGS. 2A-2C), and the pixel area has various components described below.

As shown in FIG. 2A and FIG. 3, the pixel array substrate 100 of this embodiment includes a support substrate 110, a first patterned conductor layer 120, a second patterned conductor layer 130, and a plurality of pixel electrodes 140, where the first patterned conductor layer 120 is located above the support substrate 110, and the first patterned conductor layer 120 includes at least a plurality of scan lines S100 (depicted in FIG. 2A). In this embodiment, the first patterned conductor layer 120 also includes a plurality of common lines C100 which are located between successive scan lines S100. A "conductor layer" is a layer containing electrically conductive material. A patterned conductor layer is a layer that has been patterned (such as by etching, cutting, and so forth) to form electrical structures such as the scan lines S100 and common lines C100.

The second patterned conductor layer 130 is also located above the support substrate 110, and is separated from the first patterned conductor layer 120 by an insulating layer (dielectric layer) 125. The second patterned conductor layer 130 includes at least a plurality of data lines D100 and a plurality of capacitor electrodes 132a, 132b, 132c, and so forth. In general, the materials of both the first patterned conductor layer 120 and the second patterned conductor layer 130 are metals which are electrically conductive but non-transparent. The first and second conductor layers 120 and 130 are different conductor layers that are formed on the support substrate 110 at different manufacturing steps during manufacture of the pixel array substrate 100.

A plurality of pixel areas $R_{100A}$, $R_{100B}$, $R_{100C}$, and so forth, are defined by respective pairs of data lines D100 and scan lines S100. The data lines D100 are driven by a data line driving circuit 104, and the scan lines S100 are driven by a scan line driving circuit 102. The common lines C100 are set at a reference voltage, such as a common voltage. Each common line C100 extends generally in parallel with the scan lines S100, and extends through the pixel areas such that portions of the common line C100 are considered to be provided in respective pixel areas. Each capacitor electrode 132a, 132b, 132c, and so forth, is located above the first patterned conductor layer 120 in the corresponding pixel area $R_{100A}$, $R_{100B}$, $R_{100C}$, and so forth. For example, each capacitor electrode 132a, 132b, 132c, and so forth, is located above a respective scan line S100 or common line C100 in the corresponding pixel area $R_{100A}$, $R_{100B}$, $R_{100C}$, and so forth. In the embodiment of FIG. 2A, each capacitor electrode 132 is located above a respective common line C100 portion. The pixel electrodes 140 are formed in a conductor layer that is different from the conductor layer (130) containing the common lines C100 and the conductor layer (120) containing the data lines D100.

In addition, active components A100 are provided at respective intersections of respective pairs of data lines D100 and scan lines S100. The active component A100 is, for example, a thin film transistor (TFT). Alternatively, the active component also can be, for example, a diode or another appropriate active component. More generally, the active component A100 is activated by scan line S100 to allow a voltage on a respective data line D100 to be provided to the respective pixel.

Moreover, each pixel electrode 140 is respectively located in each pixel area $R_{100A}$, $R_{100B}$, $R_{100C}$, and so forth. Each pixel electrode 140 is coupled to the corresponding active component A100 and a corresponding capacitor electrode 132. Additionally, there is an insulating layer 135 between the pixel electrodes 140 and the second patterned conductor layer 130. Note, however, that pixel electrode 140 is electrically contacted through a via 139 to a respective capacitor electrode 132 in a corresponding pixel area.

The scan lines S100, common lines C100, data lines D100, active components A100, capacitor electrodes 132, and pixel electrodes 140 are considered to be "on" the support substrate 110. Components are considered to be on the support substrate when such components are formed onto structures that are either directly or indirectly mounted on the support substrate 110.

A plurality of pixel storage capacitors $C_{ST}$ are formed by respective capacitor electrodes 132a, 132b, 132c, and so forth, and the first patterned conductor layers 120 (common lines C100 in this embodiment). In other words, each pixel storage capacitor $C_{ST}$ is formed by a respective capacitor electrode 132 and a first patterned conductor layer 120 (e.g., a corresponding common line C100 portion), which are separated by a dielectric layer 125. The capacitance of the pixel storage capacitor $C_{ST}$ is based in part (but mainly) on the area of overlap between the capacitor electrode 132 and first patterned conductor layer 120, and in part on the area of overlap between pixel electrodes 140 and respective first patterned conductor layers 120. The electrical structure of the pixel array substrate 100 according to some embodiments is generally depicted in FIG. 1, except with the addition of features according to various embodiments described below.

In accordance with some embodiments, the capacitances of the pixel storage capacitors $C_{ST}$ along a given scan line are varied with increasing distance from the input end of the given scan line (the end driven by the scan line driving circuit 102 in FIG. 2A). As depicted in FIG. 2A, a pixel array of the pixel array substrate 100 includes rows of pixels running along respective scan lines S100, and columns of pixels running along respective data lines D100. Each pixel includes various components, including TFT A100, pixel electrode 140, pixel storage capacitor $C_{ST}$, and other components. By varying (e.g., decreasing) the capacitances of pixel storage capacitors $C_{ST}$ along each row with increasing distance from the scan line input end, the feed-through voltage effect of all the pixels along each row can be made to be substantially identical. As a result, all pixels of the pixel array have substantially the same feed-through voltage effect, which reduces flickering in the display of the LCD display device and generally improves the quality of the displayed image. The feed-through voltage effect refers to the feed-through voltage ($V_{FD}$) experienced by a pixel due to coupling effect from a scan line S100 to the pixel through the capacitor $C_{GD}$ between the gate and drain of a respective TFT A100. The feed-through voltage $V_{FD}$ is defined by Eq. 1 above.

Capacitances of the pixel storage capacitors $C_{ST}$ are varied by varying areas of overlap between the capacitor electrodes 132a, 132b, 132c, and so forth, and respective first patterned conductor layers 120. The areas of overlap are reduced with increasing distance from the input ends of the scan lines S100. In the embodiment of FIG. 2A, each scan line S100 is driven by the driving circuit 102 on the left side of FIG. 2A, so that the pixel storage capacitors $C_{ST}$ in the pixel areas $R_{100A}$, $R_{100B}$, and $R_{100C}$ have the following relationship: $(C_{ST})A > (C_{ST})B > (C_{ST})C$. In the FIG. 2A embodiment, the capacitances are varied by changing the areas of capacitor electrodes 132a, 132b, 132c, and so forth. The areas of the capacitor electrodes 132a, 132b, 132c, and so forth become progressively smaller with increasing distance from the input end of the scan line S100.

In accordance with some embodiments, although the capacitor electrode areas are changed based on distance from the input end of a scan line, the apertures of the pixel areas $R_{100A}$, $R_{100B}$, $R_{100C}$, and so forth, remain substantially identical (within ±10% of each other). This is due to the fact that the areas of the first patterned conductor layers 120 in respective pixel areas are substantially identical to each other, and the capacitor electrodes 132a, 132b, 132c, and so forth, are positioned completely within the outer profile (defined by the two side edges 106, 108 of the common line C100) of the respective common line C100. As a result, since each capacitor electrode has an area that is completely within the outer profile of the respective common line (the capacitor electrode do not protrude outside the outer profile of the common line), changes in the areas of the capacitor electrodes do not cause a change in the apertures of respective pixel areas. Note that the common line C100 is formed of a non-transparent material.

In an alternative embodiment, as shown in FIG. 2B, the areas of all the capacitor electrodes 132d, 132e, 132f remain substantially identical, but the areas of the common lines C102 in the pixel areas $R_{100D}$, $R_{100E}$, $R_{100F}$, and so forth, are varied (e.g., reduced) with increasing distance from the input end of the corresponding scan line S100. For example, the width of a common line C102 in the pixel areas $R_{100D}$, $R_{100E}$, $R_{100F}$, and so forth, is reduced with increasing distance from the input end of the scan line S100. As depicted in FIG. 2B, the width of the common line C100 portion in pixel area $R_{100D}$ is W1; the width of the common line portion in pixel area $R_{100E}$ is W2; the width of the common line portion in pixel area $R_{100F}$ is W3; and so forth, where W1>W2>W3 and so forth. In this way, the areas of overlap between the capacitor electrodes 132d, 132e, 132f, and so forth, and the respective common line C100 is reduced with increasing distance from the input end of the corresponding scan line S100. However, since the areas of capacitor electrodes 132d, 132e, 132f, and so forth, in respective pixel areas are substantially identical, the same apertures for the pixel areas $R_{100D}$, $R_{100E}$, $R_{100F}$, and so forth, can be maintained. Note that the capacitor electrodes are also formed of a non-transparent material. The widths of the capacitor electrodes 132d, 132e, 132f, and so forth are substantially identical so that the varying widths of the common line portions remain completely within the outer profiles of the capacitor electrodes.

In yet another embodiment, to vary capacitances along each row of the pixel array, the areas of both capacitor electrodes and common lines can be changed, such as in the embodiment depicted in FIG. 2C. FIG. 2C uses a combination of the approaches of FIGS. 2A and 2B. As depicted in FIG. 2C, along a given row (scan line), both the areas of capacitor electrodes 132g, 132h, 132i, and so forth, and the width of the common line C104, are varied such that the effective capacitances of the storage capacitor $C_{ST}$ are reduced with increasing distance from the input end of each scan line S100. However, the same apertures for the pixel areas $R_{100G}$, $R_{100H}$, $R_{100I}$ can still be maintained.

In the embodiments of FIGS. 2A-2C, based on Eq. 1, the relationship of the pixel storage capacitors in respective pixel areas is $(C_{ST})1>(C_{ST})2>(C_{ST})3$, where $(C_{ST})1$ represents the storage capacitor closest to the input end of a given scan line, $(C_{ST})2$ represents the next farther storage capacitor along the given scan line, $(C_{ST})3$ represents the next farther storage capacitor along the given scan line, and so forth. As a result, $(\Delta V_G)1>(\Delta V_G)2>(\Delta V_G)3$, so that the effect of feed-through voltage has the relationship $(V_{FD})1 \approx (V_{FD})2 \approx (V_{FD})3$.

In an alternative embodiment, instead of changing the areas of the capacitor electrodes and/or widths of common lines C100, storage capacitance variation can be achieved by varying the distance between the capacitor electrodes 132 and respective common lines C100. Also, in other alternative embodiments, instead of the pixel electrodes 140 being arranged above the common lines C100 and the data lines D100, the pixel electrodes 140 can be moved to a different location.

Figure 4:
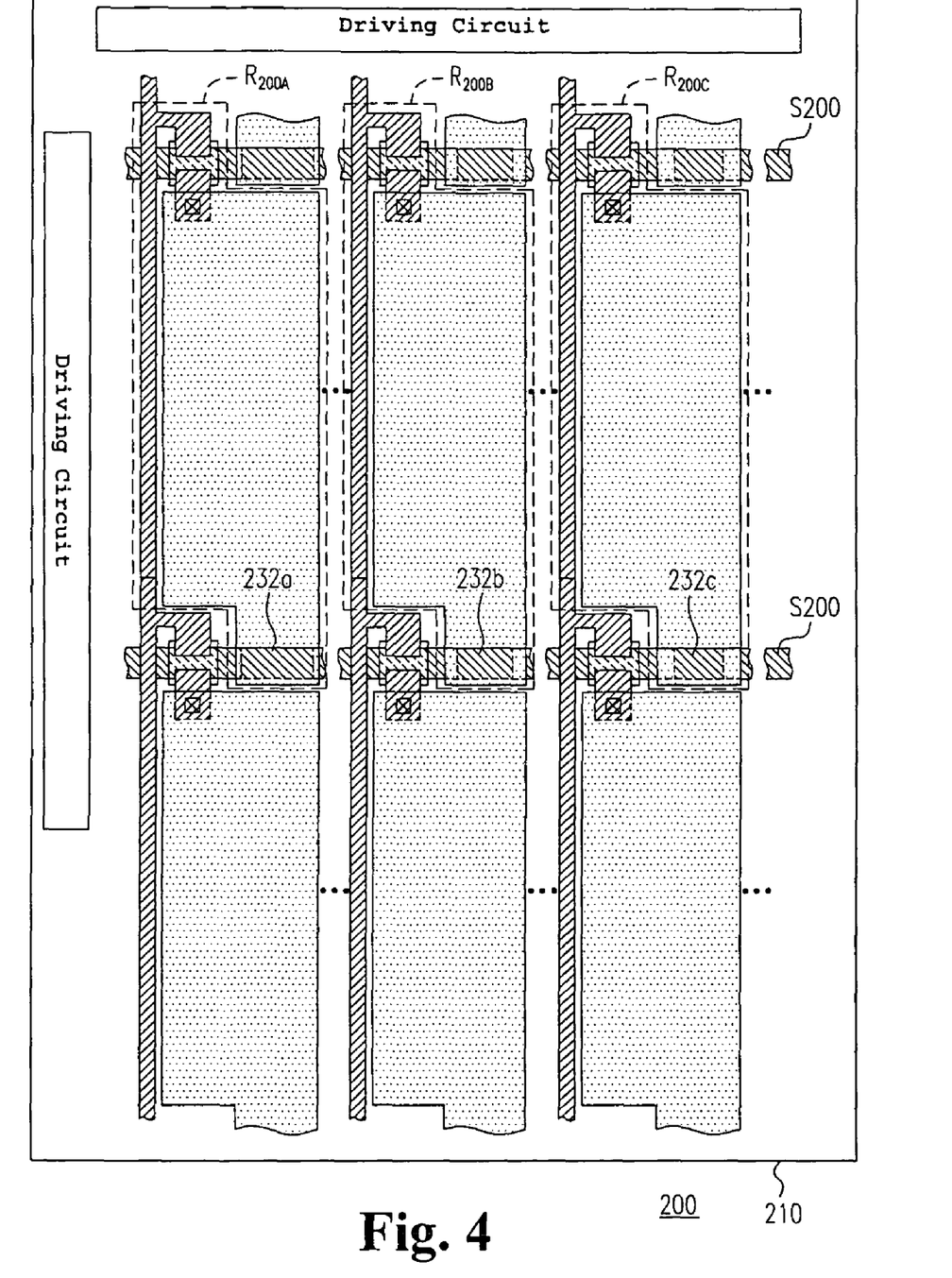
FIG. 4 is a partial top view diagram of a pixel array substrate according to another embodiment.

FIG. 4 depicts a partial top view of a pixel array substrate 200 according to another embodiment. In this embodiment, capacitor electrodes 232a, 232b, 232c, and so forth, are respectively located above and overlap scan lines S200 on one side of each corresponding pixel area $R_{200A}$, $R_{200B}$, $R_{200C}$, and so forth. In FIG. 4, the capacitor electrodes 232a, 232b, and 232c are located at the bottom sides of respective pixel areas $R_{200A}$, $R_{200B}$, $R_{200C}$. As a result, in the embodiment of FIG. 4, each storage capacitor $C_{ST}$ is formed with a capacitor electrode 232 and scan line S200 as the electrodes of the capacitors. Note that the scan lines S200 are also part of the first patterned conductor layer S200 of FIG. 3. The areas of overlap between the capacitor electrodes 232a, 232b, 232c, and so forth, and each scan line S200 is reduced with increasing distance between the pixel areas $R_{200A}$, $R_{200B}$, $R_{200C}$, and so forth, and the input end of the scan line S200. As a result, the capacitances of the storage capacitors are reduced with increasing distance from the input end of a respective scan line. Moreover, the same apertures for the pixel areas $R_{200A}$, $R_{200B}$, $R_{200C}$ can be maintained.

Figure 5:
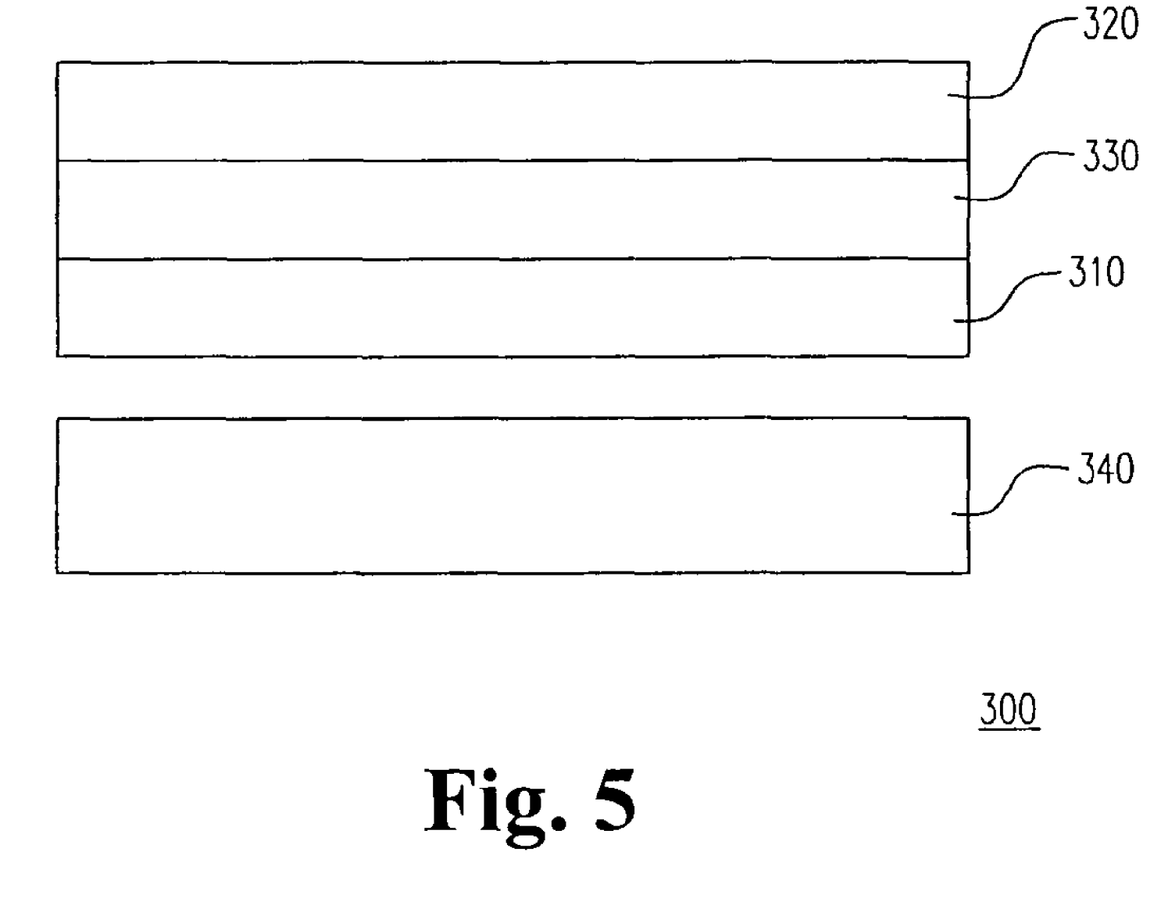
FIG. 5 is a schematic drawing of an LCD device according to an embodiment.

FIG. 5 schematically depicts an LCD device 300 according to an embodiment. The LCD device 300 includes a pixel array substrate 310, a counter substrate 320 located above the pixel array substrate 310, and a liquid crystal layer 330 between the counter substrate 320 and the pixel array substrate 310. The counter substrate 320 includes a transparent electrically conductive electrode (referred to as a common electrode) that is provided to allow development of electric fields across the liquid crystal layer 330 when pixels are activated (by writing voltages to the pixels through activated TFTs on the pixel array substrate 300). The common electrode on the counter substrate 320 is formed of a transparent electrically conductive material, such as ITO (indium tin oxide).

The pixel array substrate 310 can be, for example, the pixel array substrate 100 of FIGS. 2A-2C, the pixel array substrate 200 of FIG. 4, or any other pixel array substrate that provides for reduced storage capacitances in pixel areas with increasing distances from an input end along a scan line. The LCD device 300 further includes, for example, a backlight module 340, and the pixel array substrate 310, the opposite substrate 320, and the liquid crystal layer 330 are located proximate the backlight module 340. The backlight module 340 provides the LCD device 300 with a lighting source to display a picture in the liquid crystal layer 330. Alternatively, the LCD device 300 can be supplied with an external light source, such as ambient light or external light from an external light source.

By reducing storage capacitances in pixel areas with increasing distance of corresponding pixels from input ends of the corresponding scan lines, the feed-through voltage of the pixels on a given scan line can be adjusted to be identical to each other so that the impact from $V_{FD}$ can be eliminated by just adjusting the voltage level of the common electrode and the quality of the display can be improved (by eliminating or reducing flickering). Moreover, since the common lines or the scan lines that serve as one of the electrodes in the pixel storage capacitors already exist in many pixel array substrates, only minor changes in the arrangement of the pixel array substrates would be involved to improve the display quality without too great an increase in cost. Also, as the feed-through voltage of the pixels can be adjusted to be substantially identical to each other without changing the apertures in the pixel areas, the drawback of inhomogeneous display of the picture can be avoided.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A pixel array substrate, comprising:
   a support substrate;

a first conductor layer, a second conductor layer, and a third conductor layer, the first, second, and third conductor layers on said support substrate;
a plurality of pixel areas arranged on the support substrate, wherein each pixel area contains a pixel electrode that is part of said third conductor layer, and a capacitor electrode that is part of said second conductor layer; and
scan lines and common lines that are part of said first conductor layer, wherein each common line has portions provided in respective pixel areas,
wherein each pixel area has a storage capacitance defined by an overlapping area between the respective capacitor electrode and a respective one of the scan line and the common line,
wherein the storage capacitances of pixel areas along each scan line varies with increasing distance from a first end of each scan line, and
wherein the first conductor layer and second conductor layer are formed of metal that is electrically conductive and non-transparent.

2. The pixel array substrate of claim 1, further comprising a scan line driving circuit to drive the scan lines, wherein the first ends of respective scan lines are connected to the scan line driving circuit.

3. The pixel array substrate of claim 1, wherein the storage capacitances of the pixel areas along a particular one of the scan lines decreases with increasing distance from the first end of the particular scan line.

4. The pixel array substrate of claim 3, wherein the decreasing storage capacitances of the pixel areas along the particular scan line enable substantially identical feed-through voltage effect in all of the pixel areas along the particular scan line.

5. The pixel array substrate of claim 1, wherein apertures of the pixel areas remain substantially identical even though the storage capacitances are varied.

6. The pixel array substrate of claim 1, wherein the storage capacitances of pixel areas are varied by varying areas of respective capacitor electrodes.

7. The pixel array substrate of claim 1, wherein the storage capacitances of pixel areas are varied by varying widths of the portions of a corresponding common line in respective pixel areas.

8. The pixel array substrate of claim 1, wherein the storage capacitances of pixel areas are varied by varying areas of respective capacitor electrodes and varying widths of the portions of a corresponding common line in respective pixel areas.

9. The pixel array substrate of claim 1, wherein the storage capacitances are varied by varying distances between capacitor and the respective one of the scan line and common line.

10. The pixel array substrate of claim 1, which is adapted to be spaced apart from a counter substrate having a common electrode by a liquid crystal layer.

11. The pixel array substrate of claim 1, wherein the first, second, and third conductor layers are different layers.

12. The pixel array substrate of claim 1, wherein each pixel area further comprises an active component to enable provision of a voltage to a respective pixel electrode.

13. The pixel array substrate of claim 1, wherein each capacitor electrode is electrically contacted to a respective pixel electrode.

14. The pixel array substrate of claim 1, wherein the capacitor electrodes are provided above and overlap the common lines.

15. The pixel array substrate of claim 1, wherein the common lines are generally parallel to the scan lines.

16. The pixel array substrate of claim 1, wherein the capacitor electrodes are provided above and overlap the scan lines.

17. A liquid crystal display (LCD) device, comprising:
a counter substrate having a common electrode;
a pixel away substrate; and
a liquid crystal layer between the counter substrate and the pixel array substrate,
wherein the pixel away substrate comprises:
a support substrate;
a first conductor layer, a second conductor layer, and a third conductor layer, the first, second, and third conductor layers on the support substrate;
a plurality of pixel areas arranged on the support substrate, wherein each pixel area contains a pixel electrode and a capacitor electrode, wherein the pixel electrodes are part of the third conductor layer, and the capacitor electrodes are p art of the second conductor layer; and
scan lines and common lines that are part of the first conductor layer, wherein each common line has portions provided in respective pixel areas,
wherein each pixel area has a storage capacitance defined by an overlapping area between the respective capacitor electrode and a respective one of the scan line and common line,
wherein the storage capacitances of pixel areas along each scan line varies along the scan line, and
wherein the first conductor layer and second conductor layer are formed of metal that is electrically conductive and non-transparent.

18. The LCD device of claim 17, wherein the pixel array substrate further comprises a scan line driving circuit to drive the scan lines, and wherein first ends of the scan lines are connected to the scan line driving circuit, and
wherein the storage capacitances of the pixel areas along a particular one of the scan lines decreases with increasing distance from the first end of the particular scan line.

19. The LCD device of claim 17, wherein the storage capacitances are varied by varying areas of the capacitor electrodes.

20. The LCD device of claim 19, wherein a particular scan line or common line has a width, and wherein the capacitor electrodes overlapping the particular scan line or common line are contained entirely within the width of the particular scan line or common line such that varying the areas of the capacitor electrodes does not vary apertures of respective pixel areas.

21. The LCD device of claim 17, wherein the storage capacitances of a particular row are varied by varying widths of the portions of a particular common line, and wherein the capacitor electrodes in the particular row have substantially identical widths such that respective portions of the particular common line are contained entirely within the widths of respective capacitor electrodes.

22. The LCD device of claim 17, further comprising a backlight module to provide light to the liquid crystal layer.

23. A method of making a display device having a pixel away substrate, the pixel away substrate having first, second, and third conductor layers and having pixel areas, each pixel area having a respective capacitor electrode and a second electrode, the method comprising:
forming storage capacitances in respective pixel areas, wherein each storage capacitance is formed by overlapping a capacitor electrode with a second electrode in the corresponding pixel area, wherein the capacitor electrodes are part of the second conductor layer, wherein the pixel areas further comprise pixel electrodes that are part of the third conductor layer that is different from the second conductor layer, and wherein the second electrode is part of the first conductor layer that is different from the second and third conductor layers; and varying the storage capacitances along each of plural scan lines by varying areas of overlap between the capacitor electrodes and the second electrodes.

24. The method of claim 23, wherein a first end of each scan line is connected to a scan line driving circuit, and wherein varying the storage capacitances along each of the scan lines comprises reducing the storage capacitances with increasing distance from the first end of each scan line.

25. The method of claim 23, wherein the second electrodes comprise portions of the scan lines.

26. The method of claim 23, wherein the second electrodes comprise portions of common lines.

27. The method of claim 23, further comprising:

arranging the pixel array substrate in a display device also having a counter substrate and a liquid crystal layer, wherein the counter substrate has a common electrode, and the liquid crystal layer is between the pixel away substrate and the counter substrate.

28. The method of claim 23, further comprising electrically contacting each of the pixel electrodes to a corresponding one of the capacitor electrodes.

29. The method of claim 23, further comprising:

arranging the second conductor layer between the first conductor layer and the third conductor layer.

30. The method of claim 23, further comprising forming each of the first and second conductor layers of metal that is non-transparent.

31. The pixel away substrate of claim 1, wherein the second conductor layer is between the first conductor layer and the third conductor layer.

32. The LCD device of claim 17, wherein each of the pixel electrodes is electrically contacted to a corresponding one of the capacitor electrodes.

33. The LCD device of claim 17, wherein the second conductor layer is between the first conductor layer and the third conductor layer.

* * * * *

UNITED STATES PATENT AND TRADEMARK OFFICE
CERTIFICATE OF CORRECTION

PATENT NO. : 7,746,416 B2
APPLICATION NO. : 11/365262
DATED : June 29, 2010
INVENTOR(S) : Yuan-Liang Wu It is certified that error appears in the above-identified patent and that said Letters Patent is hereby corrected as shown below:

Column 7:
Line 44, "of pixel" should be --in pixel--;
Line 44, "areas of" should be --areas of the--;
Line 50, after "capacitor" insert --electrodes--;

Column 8:
Line 6, "away" should be --array--;
Line 9, "away" should be --array--;
Line 18, "p art" should be --part--;
Line 59, both occurrences, "away" should be --array--;

Column 10:
Line 1, "away" should be --array--;
Line 12, "away" should be --array--.

Signed and Sealed this

Fifth Day of October, 2010

David J. Kappos
*Director of the United States Patent and Trademark Office*